United States Patent [19]

Tsuda et al.

[11] Patent Number: 5,280,375
[45] Date of Patent: Jan. 18, 1994

[54] LIQUID CRYSTAL DISPLAY DEVICE WITH TWO DIFFERENT PRE-TILT ANGLES ADJACENT ON ONE SUBSTRATE

[75] Inventors: Keisuke Tsuda, Suita; Hirofumi Wakemoto, Neyagawa; Shoichi Ishihara, Katano, all of Japan

[73] Assignee: Matsushita Electric Industrial Co., Ltd., Osaka, Japan

[21] Appl. No.: 998,627

[22] Filed: Dec. 30, 1992

[30] Foreign Application Priority Data

Jan. 10, 1992 [JP] Japan .................................. 4-002622

[51] Int. Cl.$^5$ ............................................. G02F 1/1337
[52] U.S. Cl. .......................................... 359/76; 359/78
[58] Field of Search ................................... 359/76, 78

[56] References Cited

U.S. PATENT DOCUMENTS

| 4,247,174 | 1/1981 | Walter | 359/76 |
|---|---|---|---|
| 4,776,674 | 10/1988 | Filas et al. | 359/78 |
| 4,836,653 | 6/1989 | Yoshino et al. | 359/78 |
| 5,128,788 | 7/1992 | Takatoh et al. | 359/78 |
| 5,150,236 | 9/1992 | Patel | 359/78 |
| 5,151,804 | 9/1992 | Verhulst et al. | 359/76 |
| 5,198,917 | 3/1993 | Togashi | 359/76 |

FOREIGN PATENT DOCUMENTS

| 52-037450 | 3/1977 | Japan | 359/76 |
|---|---|---|---|
| 59-204823 | 11/1984 | Japan | 359/76 |
| 62-296121 | 12/1987 | Japan | 359/76 |
| 1545084 | 5/1979 | United Kingdom | 359/78 |

OTHER PUBLICATIONS

Yang, "Two-domain twisted nematic and tilted homeotropic liquid crystal displays for active matrix applications," International Display Research Conference, Oct. 1991, pp. 68–72.

Buczek, "A thin film process to improve off axis viewing of liquid crystal displays", Mol. Cryst. Liq. Cryst., vol. 47, Nos. 3 and 4 (1978), pp. 145–154.

Primary Examiner—William L. Sikes
Assistant Examiner—Anita Pellman Gross
Attorney, Agent, or Firm—Wenderoth, Lind & Ponack

[57] ABSTRACT

A liquid crystal display device including a liquid crystal panel. The liquid crystal device is made up of first and second substrates, a first alignment layer formed on a surface of the first substrate so as to have a first pre-tilt angle, a second alignment layer formed on a surface of the second substrate so as to have a second pre-tilt angle which is smaller than the first pre-tilt angle, a third alignment layer formed on the surface of the second substrate so as to have a third pre-tilt angle which is greater than the first pre-tilt angle, and nematic liquid crystal material filled in a space between the first and second substrates. The liquid crystal panel would be oriented so as to have a helical structure extending in a predetermined direction by the effect of the pre-tilt angles if nematic liquid crystal material having no twisting power were to be filled in a space between the first and second substrates, but the nematic liquid crystal material employed is of a kind effective to render the liquid crystal panel to be oriented so as to have a helical structure extending in a direction counter to the predetermined direction.

9 Claims, 10 Drawing Sheets

LIQUID CRYSTAL DISPLAY DEVICE WITH TWO DIFFERENT PRE-TILT ANGLES ADJACENT ON ONE SUBSTRATE

BACKGROUND OF THE INVENTION

1. Field of the Invention

The present invention relates to a liquid crystal display device and a method of manufacturing the liquid crystal display device.

2. Description of the Prior Art

Of the various types of liquid crystal display devices commercially available in the market, a liquid crystal display device utilizing an active matrix driving scheme, known as an active matrix drive liquid crystal display device, is largely developed. The active matrix drive liquid crystal display device employs thin-film transistors as switching elements and is well recognized superior in that, as compared with a liquid crystal display device utilizing a simple matrix driving scheme, a high contrast ratio can be attained regardless of the number of scanning electrodes and, hence, a clear, high-contrast image can be displayed at a high resolution.

While the active matrix drive liquid crystal display device is available in various types depending on the type of liquid crystal material employed, the active matrix drive liquid crystal display device employing twisted nematic liquid crystal has a normally white display mode. As is well known to those skilled in the art, the TN (twisted nematic) liquid crystal display device comprises a liquid crystal panel of a structure wherein liquid crystal material having 90° twisted liquid crystal molecules is sandwiched between substrates, and a pair of polarizing plates with the liquid crystal panel sandwiched therebetween.

The TN liquid crystal display device having a normally white display mode is so designed that, while the direction of polarization of one polarizing plates is perpendicular to that of the other polarizing plate, one of the polarizing plates has its polarizing axis extending parallel or perpendicular to the major axis of the liquid crystal molecules held in contact with one of the substrates. In this normally white display mode of the TN liquid crystal display device, an image is displayed against a white background when no voltage is applied or a low voltage around a threshold value is applied while an image is displayed against a black background when a voltage higher than that is applied.

A mechanism of image display accomplished in the TN liquid crystal display device is such that, when a voltage is applied to the liquid crystal panel to cause the liquid crystal molecules, in a twisted state, to untwist, the liquid crystal molecules come to be oriented in a direction conforming to the direction of an electric field, permitting light passing across the liquid crystal panel to exhibit a different polarized characteristic with its transmittance modulated consequently. However, for a given orientation of the liquid crystal molecule, the polarization of light passing across the liquid crystal panel varies with a change in direction in which the light enters the liquid crystal display panel and, hence, the transmittance of light varies with a change in direction of incidence of the light upon the liquid crystal display panel. This means that the liquid crystal panel has an operating characteristic which is affected by characteristics of the viewing angle.

Specifically, in the normally white mode, the above discussed problem is considerable about when the black picture is displayed in which the liquid crystal molecules are set up relative to the substrates as a result of an application of the voltage. The characteristics of the viewing angle at this time are such as to be symmetric with respect to a plane containing the direction of the major axis of the liquid crystal molecules adjacent a center of the liquid crystal layer and perpendicular to the substrates, exhibiting a considerable change in transmittance of the light travelling towards such plane with a change in angle of incidence of the light upon the substrate. Accordingly, a change in characteristic of the viewing angle is particularly considerable in such direction.

In practice, however, since a rubbing is effected to the front substrate 1A, as viewed towards a display screen, in a direction shown by the arrow 18 in FIG. 8 and also to the rear substrate 1B in a direction shown by the arrow 19 in FIG. 8, the major axis of the liquid crystal molecules adjacent the center of the liquid crystal layer align on a plane perpendicular to any one of the front and rear substrates 1A and 2B, and therefore, the direction in which the change in characteristic of the viewing angle is considerable lies in a direction 34 heightwise of the display screen and symmetric in a horizontal direction as viewed towards the display screen.

The prior art TN liquid crystal display device of the type referred to above operating under the normally white mode has the following problems. Namely, if under the normally white mode the liquid crystal molecules completely set up in a direction perpendicular to the substrate surface upon application of the voltage, the display screen exhibit a true black color when viewed in a direction perpendicular to the substrate. This is because, when the major axis of the liquid crystal molecules lines up with each other in a direction parallel to the direction of travel of light, no optical phase difference occurs and the light passes across the liquid crystal layer with no polarized component thereof varied.

However, in practice, some of the liquid crystal molecules adjacent the substrate interface are hard to set up, even when the voltage is applied to a certain extent, due to an interaction thereof with the substrate. Also, even another portion of the liquid crystal molecules adjacent the center of the liquid crystal layer fails to set up and, therefore, no optical phase difference is eliminated with respect to the light travelling in a direction perpendicular to the substrate, failing to represent a true black color.

On the other hand, under such a molecule orientation, the light travelling in a direction substantially parallel to the direction of the major axis of some of the liquid crystal molecules adjacent the center of the liquid crystal exhibits a minimized optical phase difference as compared with the light travelling in a direction perpendicular to the substrate. Accordingly, in the actually manufactured liquid crystal panel, the characteristic of the viewing angle tends to become considerably asymmetric as shown in FIG. 9 on respective sides of the line normal to the substrate in a direction vertically of the display screen.

When the liquid crystal panel having the asymmetric characteristic as discussed above is employed in a video projection system, the following problem occurs.

In the case of the video projection system, it is generally recommended that while a projection lens employed having as small a F-number as possible, the projection lens receives the incoming light at a relatively large coverage, so that the image projected onto a screen becomes bright. This means that the liquid crystal panel as well should receive the incoming light at a large coverage. In order for the liquid crystal panel to receive light from the light source at a large coverage, the use must be made of a condensing lens for collecting the incoming light.

While a metal halide lamp is generally used as the light source in the video projection system, such a light source is not a point source of light and, therefore, it is difficult to provide a bundle of parallel rays of light. In view of the limitation imposed by the optics employed in the video projection system, the angle of incidence of light upon the liquid crystal panel and the coverage of light afforded by the liquid crystal panel vary from one local area of the liquid crystal panel to another.

Accordingly, where the characteristic of the viewing angle of the liquid crystal panel is asymmetric as discussed hereinbefore, the characteristic of the viewing angle of the liquid crystal panel varies from one local area to another, accompanied by a change in transmittance exhibited by the liquid crystal panel to such an extent that the image eventually displayed may have a varying brightness.

To improve the characteristic of the viewing angle, the following method is suggested.

Referring to FIG. 10, the alignment of the liquid crystal molecules 9 relative to the substrate 37 when the liquid crystal molecules 9 are rubbed in a direction shown by the arrow 35 is such that the liquid crystal molecules 9 contact the substrate 37 at a trailing side with respect to the direction of rubbing and are inclined upwardly and away from the substrate 37 at a angle $\theta$. This angle $\theta$ of inclination of the liquid crystal molecules 9 relative to the substrate 37 is generally known as a pre-tilt angle 36.

FIG. 4 illustrates the direction of alignment processing effected to the liquid crystal panel by means of a rubbing technique. As shown therein, since the rubbing is effected to the front substrate 1A in the direction shown by the arrow 18 and to the rear substrate 1B in the direction shown by 19, if the alignment process is effected to the substrates 1A and 1B in such directions, the nematic liquid crystal molecules having not been twisted are, because of the pre-tilt of the liquid crystal molecules at the interface with each of the substrates, oriented so as to depict a helix 20 extending counterclockwise from the front substrate 1A towards the rear substrate 1B. On the other hand, if a chiral material having a clockwise twisting force is injected into the nematic liquid crystal and if the twisting force is strong, the result would be that the liquid crystal molecules at the interface with each of the substrates are oriented so as to depict a helix extending clockwise from the front substrate 1A towards the rear substrate 1B. It is, however, to be noted that the molecules at the interface with the substrate are oriented exhibiting a pre-tilt angle 30 conforming to the direction of orientation since they are subjected to an anchoring force resulting from the rubbing.

Under such an orientation, if portions of the liquid crystal molecules 9 touching the substrates 1A and 1B, respectively, have an equal pre-tilt angle 15 as shown in FIG. 11, the liquid crystal molecules 9 at the center 10 of the liquid crystal layer are not inclined and have their major axes extending parallel to any one of the substrates. In such case, application of an electric voltage between the substrates 1A and 1B results in an orientation of the liquid crystal molecules at the center 10 of the liquid crystal layer which incline as shown by $+\theta m39$ and $-\theta m39$, respectively, in FIG. 12 with an equal amount of energies given at the time of elastic deformation. Accordingly, this liquid crystal panel in the case under discussion will exhibit such a characteristic of viewing angle that, if the liquid crystal molecules set up at an angle of inclination of $+\theta m38$, the black picture tend to sink at a position somewhat upwardly of the direction perpendicular to the substrate (this characteristic being hereinafter referred to as an upward viewing characteristic), but if they set up at an angle of inclination of $-\theta m39$, the black picture tends to sink at a position somewhat downwardly of the direction perpendicular to the substrate (this characteristic being hereinafter referred to as a downward viewing characteristic).

The orientation of such upward and downward viewing characteristics exist alternating in minute regions and if these minute regions are uniformly distributed over the entire surface area of the liquid crystal panel, the characteristic of the viewing angle of this liquid crystal panel presents a mixture of the upward and downward viewing characteristics and gives an apparent symmetric characteristic in upward and downward directions. However, under such an orientation, it is random as to which one of molecule movements of one of the two equal energy conditions is assured at the time of application of the voltage and, therefore, the controllability is very instable. Therefore, the prior art liquid crystal panel is not suited for use in the liquid crystal display device.

SUMMARY OF THE INVENTION

Accordingly, the present invention has for its object to provide an improved liquid crystal display device, and a method for the manufacture of the same, which is effective to present a high-quality image display at a uniform brightness over the entire surface thereof and which is capable of exhibiting a symmetrical characteristic of the viewing angle in a direction vertical of the liquid crystal panel with no need to tilt the main axis of light incident upon the liquid crystal panel in a direction away from the normal to the substrate.

To this end, the present invention provides a liquid crystal display device including a liquid crystal panel. The liquid crystal deice is made up of first and second substrates, a first alignment layer formed on a surface of the first substrate so as to have a first pre-tilt angle, a second alignment layer formed on a surface of the second substrate so as to have a second pre-tilt angle which is smaller than the first pre-tilt angle, a third alignment layer formed on the surface of the second substrate so as to have a third pre-tilt angle which is greater than the first pre-tilt angle, and nematic liquid crystal material filled in a space between the first and second substrates. The liquid crystal panel would be oriented so as to have a helical structure extending in a predetermined direction by the effect of the pre-tilt angles if nematic liquid crystal material having no twisting power were to be filled in a space between the first and second substrates, but the nematic liquid crystal material employed is of a kind effective to render the liquid crystal panel to be oriented so as to have a helical structure extending in a direction counter to the predetermined direction.

Preferably, the second substrate has a matrix of pixels formed thereon, and the second and third alignment layers are formed over the matrix of the pixels in the predetermined pattern.

The liquid crystal display device according to the present invention os the type referred to above can be fabricated by forming the second alignment layer, which gives the second pre-tilt angle when rubbed, by means of a printing technique, on a predetermined portion of the surface of the second substrate and subsequently forming the third alignment layer, which gives the third pre-tilt angle when rubbed, by means of a printing technique, on another portion of the surface of the second substrate different from said predetermined portion.

Preferably, where a fine pattern is desired to be used in place of the printing technique, the use may be made of a photo-masking medium to form patterned alignment layers by means of a photolithographic method thereby to form the areas of different pre-tilt angles on the alignment layer.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which.

DETAILED DESCRIPTION OF THE EMBODIMENTS

Figure 1:
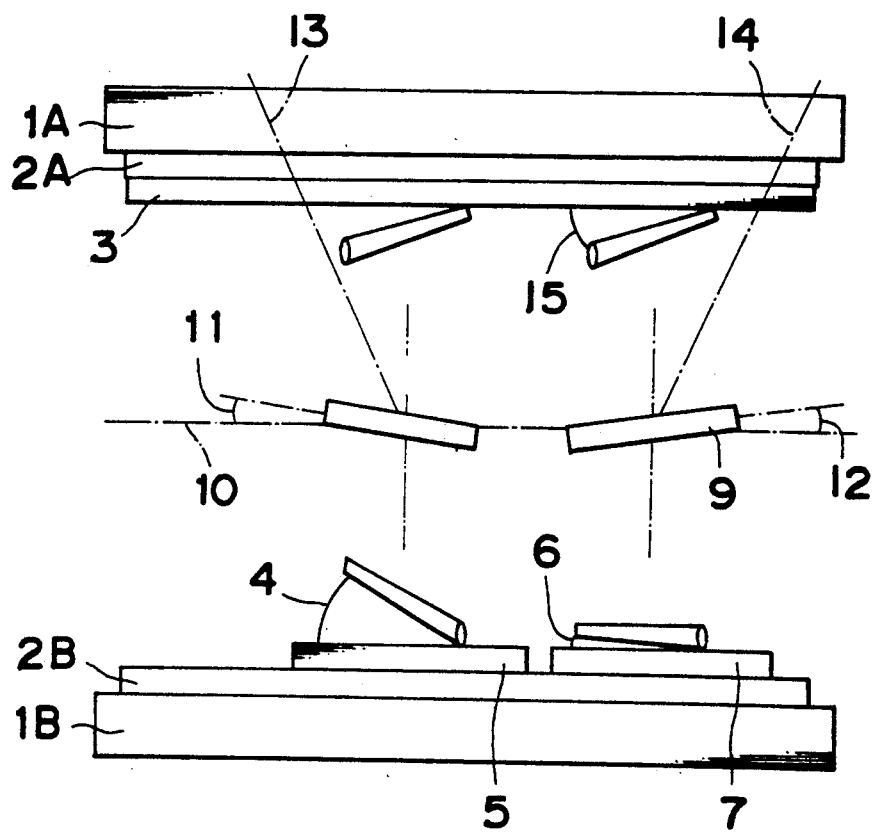
FIG. 1 is a schematic sectional view showing the orientation of liquid crystal molecules in a liquid crystal display device according to the present invention.

Referring to FIG. 1, a liquid crystal display device embodying the present invention comprises first and second substrates 1A and 1B and a liquid crystal layer sandwiched between the first and second substrates 1A and 1B. An inner surface of each of the first and second substrates 1A and 1B confronting the liquid crystal layer is deposited with transparent electrodes 2A and 2B, the transparent electrodes 2A being covered by an alignment layer 3 while the transparent electrodes 2B are covered by alignment layers 5 and 7. The alignment layer 5 has a pre-tilt angle 4 which is greater than that of the alignment layer 3 and the alignment layer 7 has a pre-tilt angle 6 which is smaller than that of the alignment layer 3.

In FIG. 1, reference numeral 9 represents liquid crystal molecules forming the liquid crystal layer substantially sandwiched between the first and second substrates 1A and 1B; reference numeral 10 represents a center of the liquid crystal layer intermediate the distance between the substrates 1A and 1B; reference numeral 11 represents a pre-tilt angle $\phi 1$ of the liquid crystal molecule at the center of the liquid crystal layer; reference numeral 12 represents a pre-tilt angle $\phi 2$ of the liquid crystal molecule at the center of the liquid crystal layer; reference numeral 13 represents an upward viewing direction; and reference numeral 14 represents a downward viewing direction.

In the above described structure, an alignment process is carried out to the first substrate 1A so that a pre-tilt angle 15 of $\theta$ can be attained, and also to the second substrate 1B so that two oriented areas having a pre-tilt angle 4 of $\theta + \phi 1$ and a pre-tilt angle 6 of $\theta - \phi 2$ ($\phi 1 > 0$, $\theta > \phi 2 > 0$) can be formed. By so doing, the liquid crystal molecules 9 at the center 10 of the liquid crystal layer that are aligned with the area having the pre-tilt angle 4 of $\theta + \phi 1$ exhibits a pre-tilt 11 of an angle of about $\phi 1$, whereas the liquid crystal molecules 9 at the center 10 of the liquid crystal layer that are aligned with the area having the pre-tilt angle 6 of $\theta - \phi 2$ exhibits a pre-tilt 12 of an angle of about $-\phi 2$.

Accordingly, when a voltage is applied to this liquid crystal panel, the liquid crystal molecules 9 at the center 10 of the liquid crystal layer necessarily exhibit the downward viewing characteristic 14 at the area where the angle of the pre-tilt 12 was about $-\phi 2$ and the upward viewing characteristic 13 at the area where the angle of the pre-tilt 11 was about $\phi 1$. Where the areas having the upward and downward viewing characteristics, respectively, are so arranged in neighboring relationship with each other closer than the resolution of the human eyes, the characteristic of the viewing angle exhibited by the liquid crystal panel is such that the respective characteristics of the two areas are combined together, making it possible to give rise to a substantially symmetrical characteristic with respect to the normal perpendicular to the substrate in both upward and downward directions, and therefore, even in the image projected through the projection optics, the projected image is substantially free from a varying brightness while exhibiting a high quality.

A method of making the liquid crystal display device according to a first preferred embodiment of the present invention will now be described with particular reference to FIGS. 1 to 5 and FIG. 13.

Figure 2A:
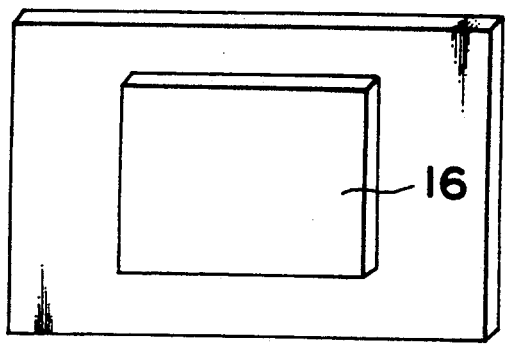
FIG. 2(a), 2(b), and 2(c) are a perspective view showing a printing plate used during the formation of an alignment layer.

At the outset, a printing plate 16 having a projection such as shown in FIG. 2(a) was placed on a glass substrate 1A having an array of transparent line electrodes 2A formed thereon, and a polyimide alignment layer 3, made of polyimide (commercially available from Japan Synthetic Rubber Co., Ltd. and identified by JALS-199) was printed thereon by means of an offset printing technique. With the use of the offset printing technique, the alignment layer 3 could have been formed uniformly over the entire surface of the glass substrate while overlaying the line electrode array.

Figure 2B:
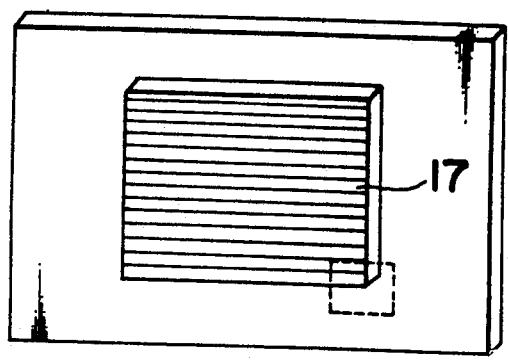
Figure 2C:
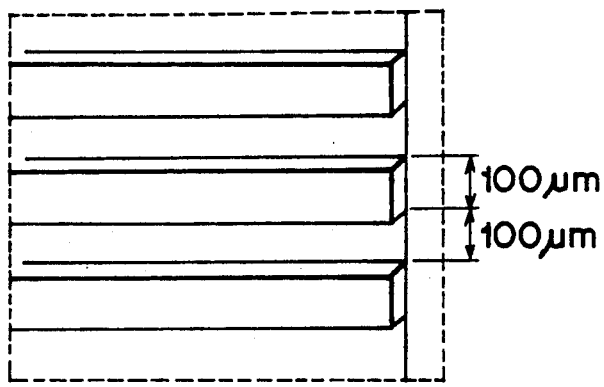
Figure 3A:
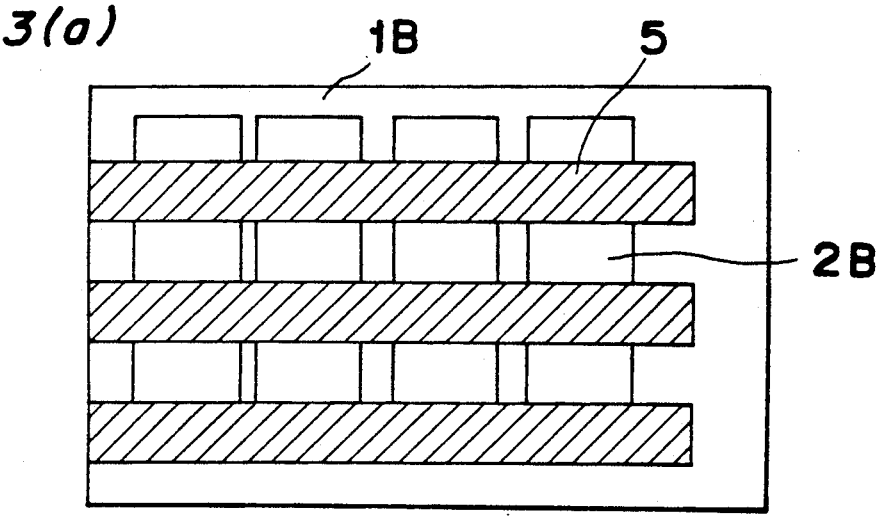
FIGS. 3(a) and 3(b) illustrate the sequence of pattern formation practiced during the formation of the alignment layer according to a first embodiment of a method of the present invention.

Then, with the use of a printing plate 17 having a pattern of stripes formed thereon at a pitch of 200 μm such as shown in FIG. 2(b), a polyimide alignment layer 5 made of polyimide (commercially available from Japan Synthetic Rubber Co., Ltd. and identified by JALS-194) was formed on a substrate 1B having an array of transparent column electrodes 2B formed thereon. It is to be noted that the polyimide alignment layer 5 formed on the substrate 1B so as to overlay the column electrode array is in the form of a plurality of orientation stripes as shown in FIG. 3(a).

Figure 3B:
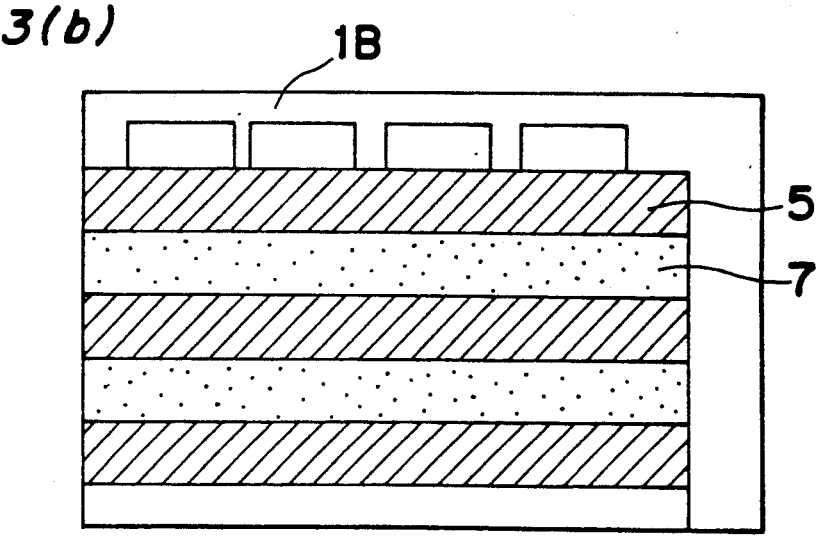

Subsequent to the formation of the alignment layer 5, and with the use of a printing plate 17 having a pattern of stripes formed thereon at a pitch of 200 μm, but offset about 100 μm from those on the printing plate shown in FIG. 2(b), a polyimide alignment layer 7 made of polyimide (commercially available from Japan Synthetic Rubber Co., Ltd. and identified by Optomer-AL-2061) was formed on the substrate 1B so that the polyimide stripes forming the alignment layers 5 and 7 alternate with each other as shown in FIG. 3(b).

The substrates 1A and 1B were then heated at 190° C. for one hour to cure the alignment layers 3, 5 and 7 while allowing a solvent used to evaporate.

Figure 4:
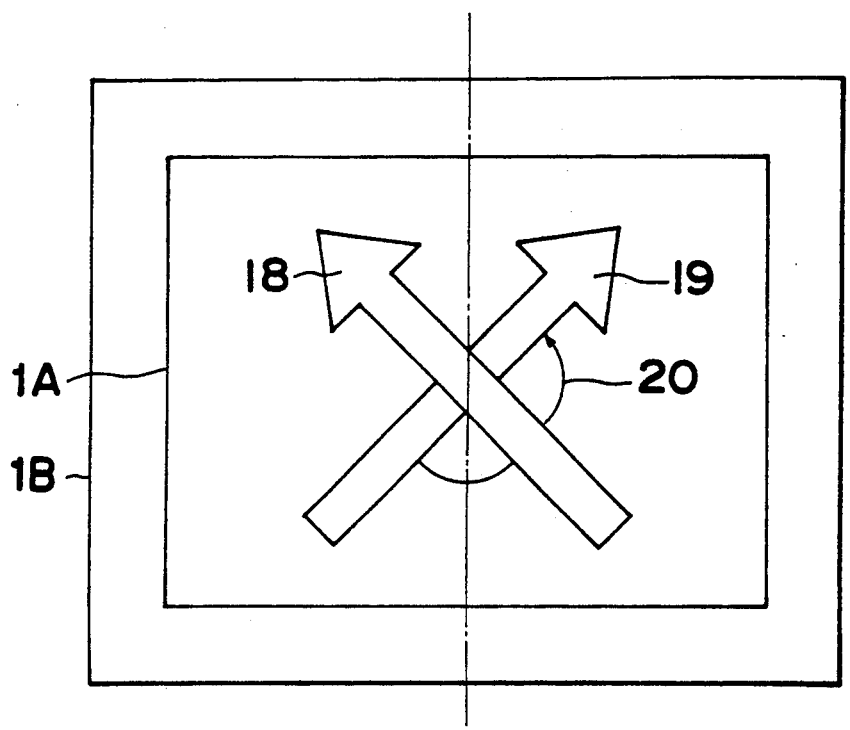
FIG. 4 is a schematic plan view showing a rubbing direction in the practice of the first embodiment of the method of the present invention.

After the heating, the substrates 1A and 1B were rubbed with Rayon fabric in respective directions shown by the arrows 18 and 19 in FIG. 4, and the substrates 1A and 1B were then bonded together with the line electrode array 2A facing the column electrode array 2B, thereby completing a panel. In the panel having been subjected to the above described alignment process, when nematic liquid crystal having no twisting power is injected, what is oriented is stabilized in terms of energy under the influence of the pre-tilt while depicting a counterclockwise helix 20.

Liquid crystal material added with a chiral material R-811 (commercially available from Merck and identified by ZLI-4792), having a clockwise twisting power, to render the chiral pitch to be about 80 μm was added in the panel so prepared.

In order to determine the pre-tilt angles brought about by the rubbing when the above described alignment material and the liquid crystal material were employed, measurement was carried out by the use of the crystal rotation method. During the measurement, a sample cell was employed which is formed by depositing the same alignment layers on two transparent substrates, rubbing the substrates, bonding the substrates together at a cell thickness of 20 μm so as to assume a homogeneous alignment and finally injecting the liquid crystal material.

A result of the measurement has indicated that the pre-tilt angles of JALS-199, JALS-194 and Optomer-AL-2061 alignment layers 3, 5 and 7 were about 3°, about 4° and about 1°, respectively, and, therefore, it has been confirmed that the alignment of the liquid crystal panel according to the foregoing embodiment of the present invention was such as shown in FIG. 1.

Figure 5:
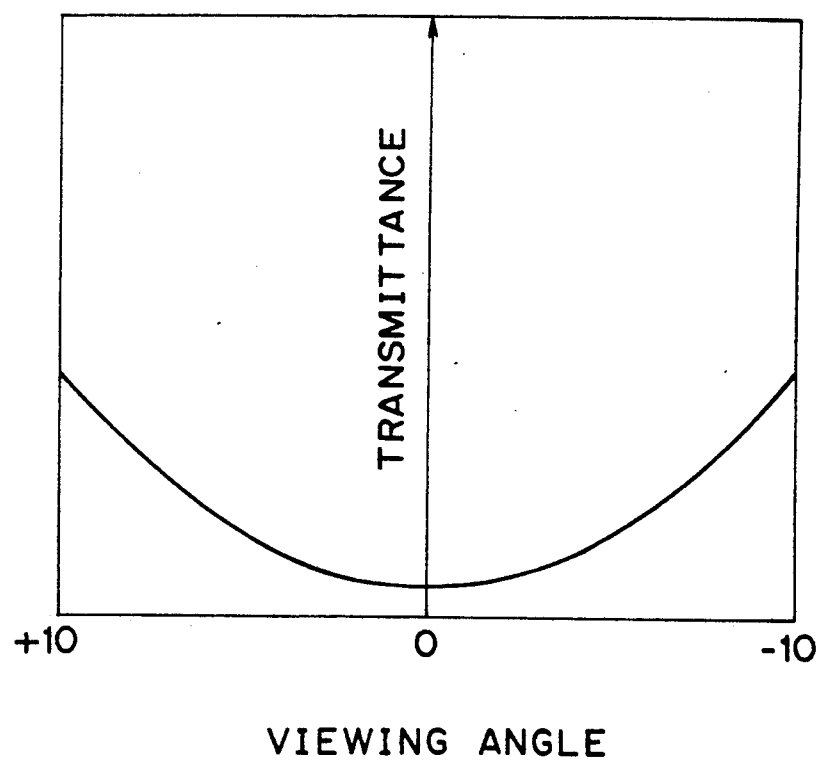
FIG. 5 is a graph showing characteristic of the viewing angle exhibited by the liquid crystal display device manufactured according to the first embodiment of the method of the present invention.

The liquid crystal display device of the present invention was prepared by bonding a polarizing plate to each surface of the liquid crystal panel, prepared in the manner described above, so as to represent a cross Nicols. When a measurement was carried out to determine the transmission characteristic thereof dependent on the viewing angle by applying a voltage to the liquid crystal panel, such a symmetrical characteristic in upward and downward directions relative to the normal to the panel substrate as shown in FIG. 5 was observed.

A second embodiment of the manufacturing method will now be described with reference to FIGS. 6 and 14.

Figure 6A:
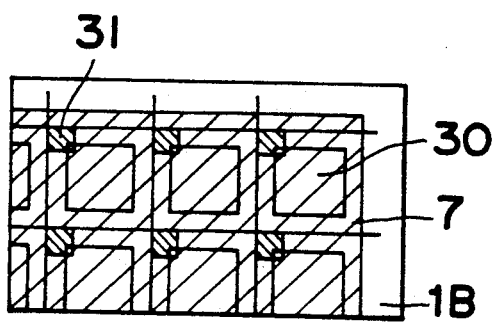
FIGS. 6(a) to 6(f) illustrate the sequence of pattern formation practiced during the formation of the orientation layer according to a second embodiment of a method of the present invention.

A JALS-199 alignment layer 3 was printed by means of an offset printing method on a glass substrate 1A formed with an array of transparent electrodes. By this printing method, the alignment layer 3 was uniformly formed over the entire surface of the glass substrate. Thereafter, using the same method as applied to the glass substrate 1A, an Optomer-AL-2061 alignment layer 7 was formed uniformly, as shown in FIG. 6(a), over the entire surface of an active matrix array substrate 1B formed with an array of thin-film transistor elements 31 for pixels 30. Both of the glass substrates 1A and 1B were then heated at 190° C. for one hour to cure the respective alignment layers.

Figure 6D:
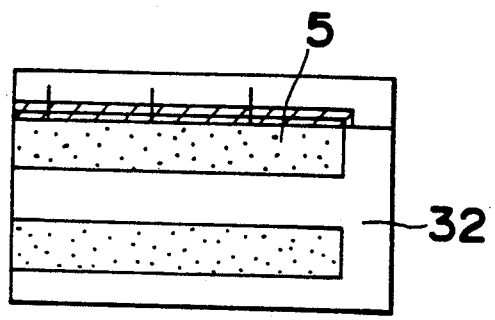
Figure 6B:
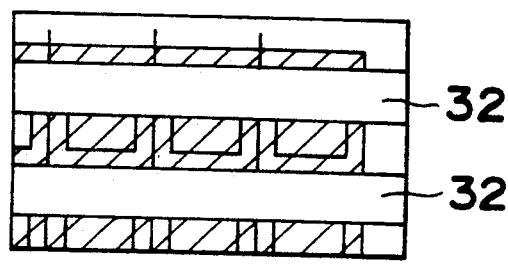

After a layer 32 of chromium had been deposited so as to overlay the alignment layer 7 on the active matrix array substrate 1B, portions of the chromium layer 32 other than portions thereof above the pixels were removed, as shown in FIG. 6(b), according to a photolithographic method using a ask having an array of square apertures complemental in pattern to the pattern of the pixels 30.

Figure 6E:
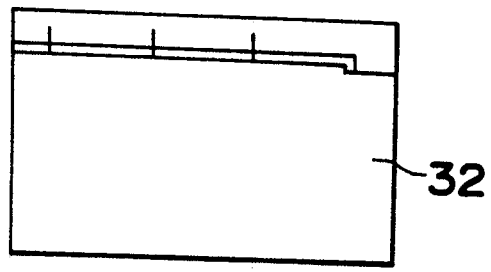
Figure 6C:
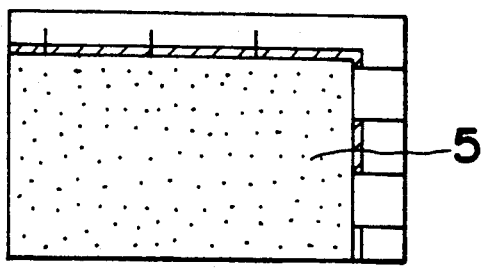

On the other hand, using the same technique, a JALS-194 alignment layer 5 was printed on the substrate 1B so as to overlay the thin-film transistor array over the entire surface thereof as shown in FIG. 6(c) and was then cured by heating at 190° C. for one hour. Then, after a layer 32 of chromium had been deposited so as to overlay the alignment layer 5 on the active matrix array substrate 1B, portions of the chromium layer 32 other than portions thereof beneath the pixels 30 were removed, as shown in FIG. 6(d), according to a photolithographic method using a mask having an array of square apertures complemental in patter to the pattern of the pixels 30. While in this condition, the active matrix array substrate 1B was immersed in a solution of γ-butyrolactone and was then shaken, portions of the JALS-194 alignment layer 5 aligned with upper halves of the pixels 30 that were not shielded by the chromium layer 32 were completely removed.

Figure 6F:
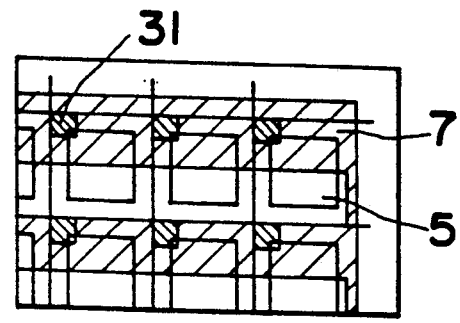

Thereafter, as shown in FIG. 6(e), the chromium layer remaining while overlaying the entire surface was etched off in an etching solution, allowing the Optomer-AL-2061 alignment layer 7 to be formed on the active matrix substrate 1B so as to cover upper halves of the pixels 30 and also allowing the JALS-194 alignment layer 5 to be formed on the active matrix substrate 1B so as to cover lower halves of the pixels 30 as shown in FIG. 6(f).

The substrates 1A and 1B were then rubbed with Rayon fabric in respective directions shown by the arrows 18 and 19 in FIG. 4, and the substrates 1A and 1B were then bonded together with the line electrode array 2A facing the column electrode array 2B, thereby completing a panel. Liquid crystal material added with a chiral material R-811 (commercially available from Merck and identified by ZLI-4792), having a clockwise twisting power, to render the chiral pitch to be about 80 μm was finally injected in the panel so prepared.

The liquid crystal display device of the present invention was prepared by bonding a polarizing plate to each surface of the liquid crystal panel, prepared in the manner described above, so as to represent a crossed Nicols. When a measurement was carried out to determine the transmission characteristic thereof dependent on the viewing angle by applying a voltage to the liquid crystal panel, a symmetrical characteristic in upward and downward directions relative to the normal to the panel substrate, similar to that exhibited in the foregoing embodiment, was observed.

When the liquid crystal display device so assembled was incorporated in the image projection system and an image was then projected onto a screen, a favorable display of a high-quality image could be obtained at a uniform brightness.

Figure 14:
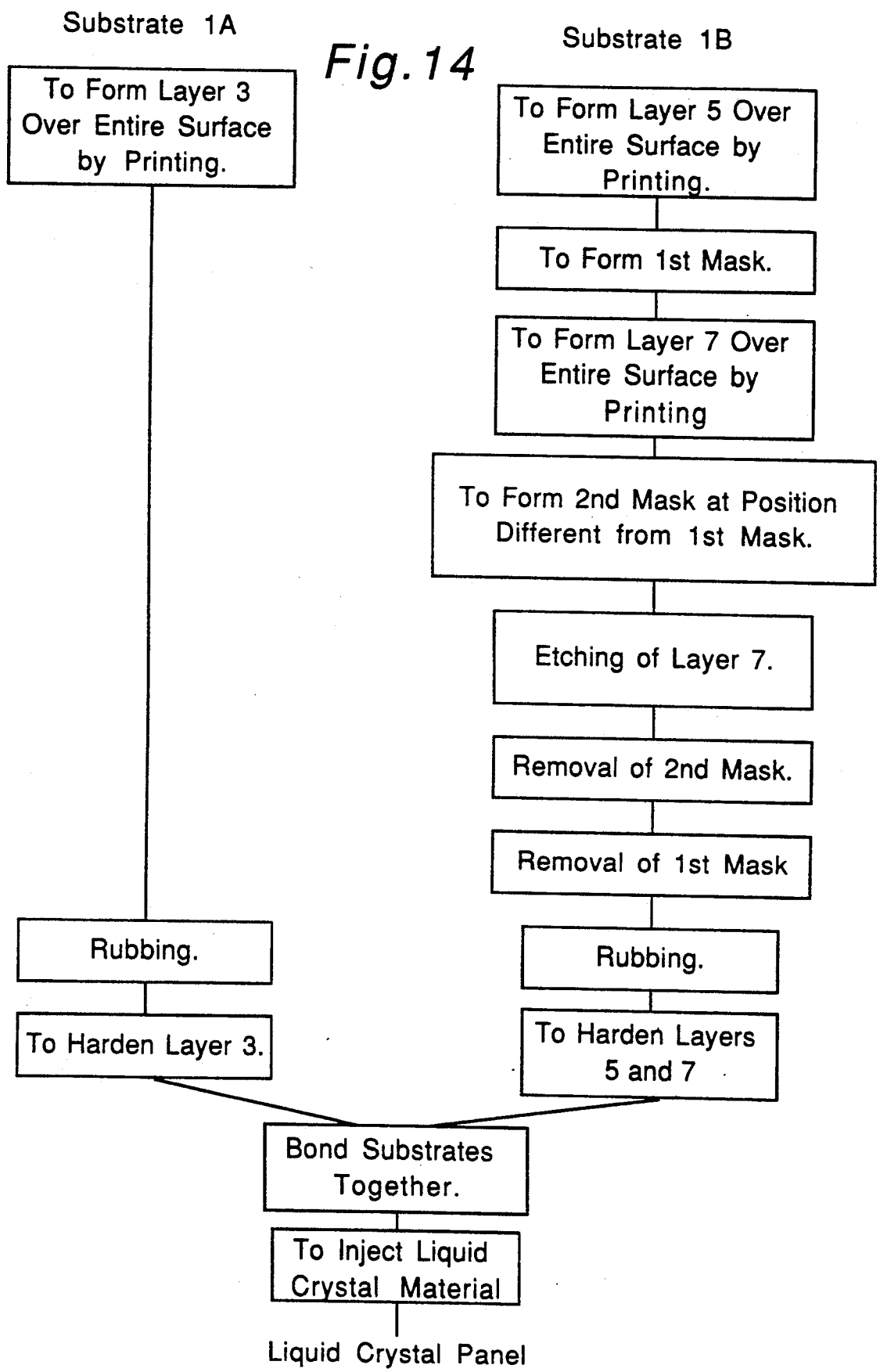
Figure 15:
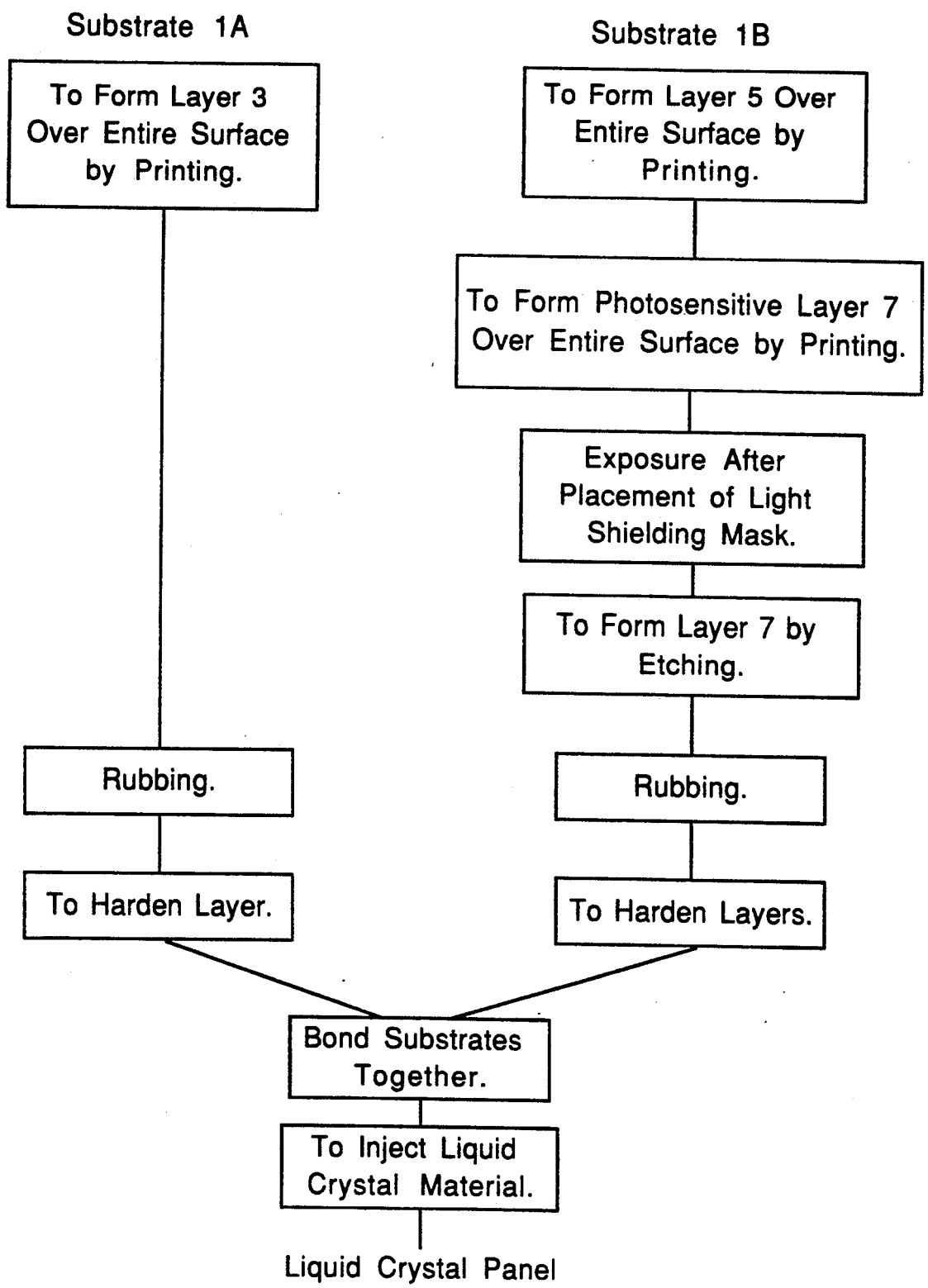

FIGS. 7 and 14 illustrates the sequence of assembly of the liquid crystal panel according to a third preferred embodiment of the present invention.

Figure 7A:
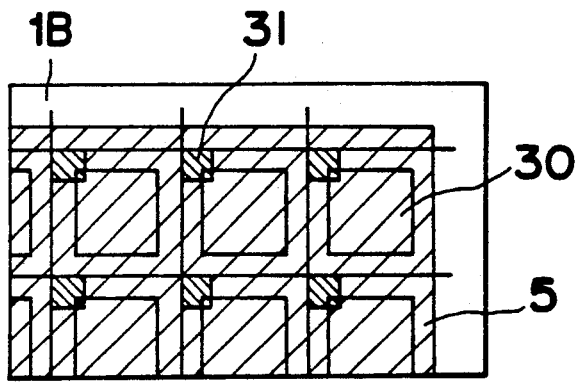
FIGS. 7(a) to 7(d) illustrate the sequence of pattern formation practiced during the formation of the orientation layer according to a third embodiment of a method of the present invention.
Figure 7B:
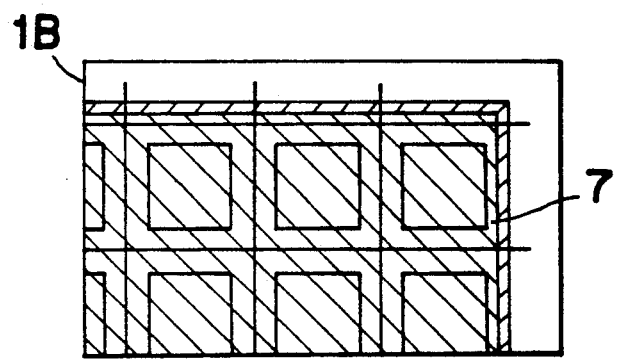
Figure 7C:
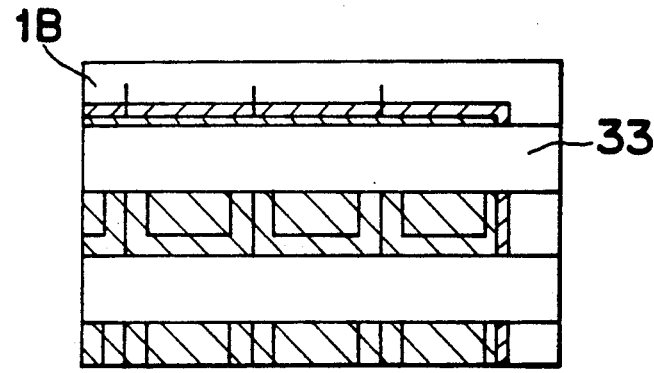
Figure 7D:
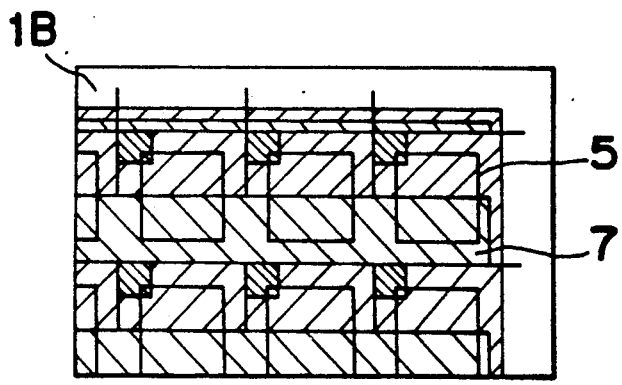

A JALS-199 alignment layer 3 was printed by means of an offset printing method on a glass substrate 1A formed with an array of transparent electrodes. By this printing method, the alignment layer 3 was uniformly formed over the entire surface of the glass substrate. Thereafter, using the same method as applied to the glass substrate 1A, an JALS-194 alignment layer 5 was formed uniformly, as shown in FIG. 7(a), over the entire surface of an active matrix array substrate 1B formed with an array of thin-film transistor elements 31 for pixels 30. Both of the glass substrates 1A and 1B were then heated at 190° C. for one hour to cure the respective alignment layers.

Figure 8:
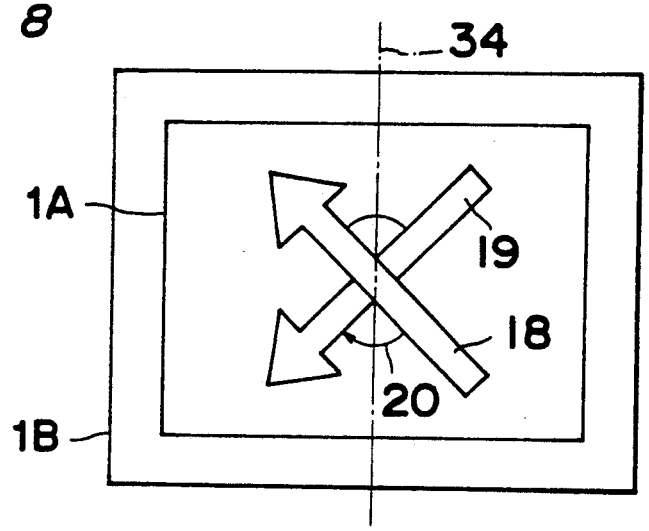
FIG. 8 is a schematic plan view showing a rubbing direction.
Figure 9:
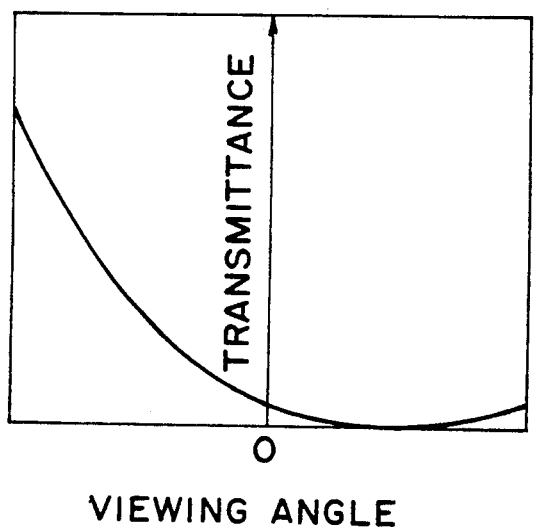
FIG. 9 is a graph showing characteristic of the viewing angle exhibited by the prior art liquid crystal display device.
Figure 10:
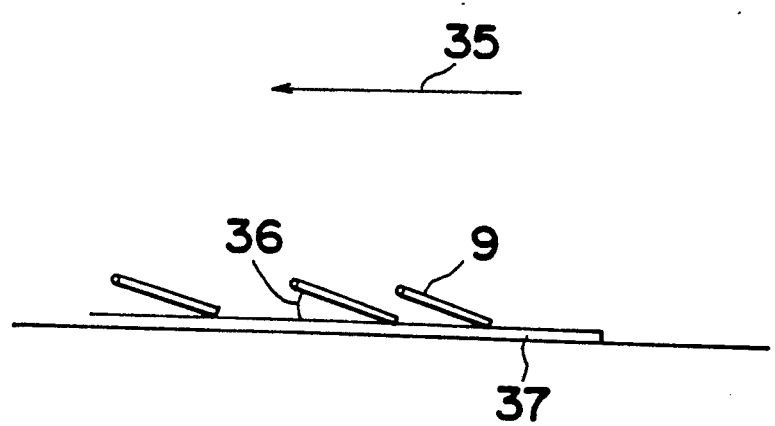
FIG. 10 is a schematic diagram showing a relationship between the rubbing direction and the direction of alignment of the liquid crystal molecules in the liquid crystal display device.
Figure 11:
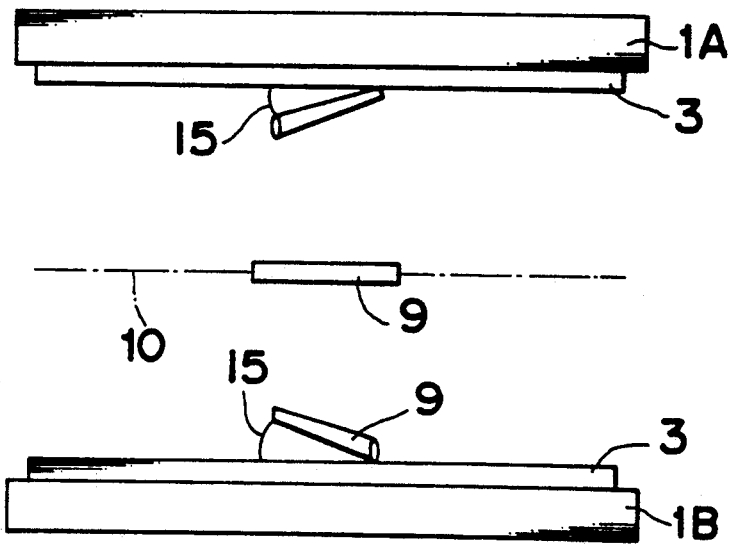
FIG. 11 is a schematic sectional view showing the alignment of the liquid crystal molecules when no voltage is applied to the liquid crystal display device.
Figure 12:
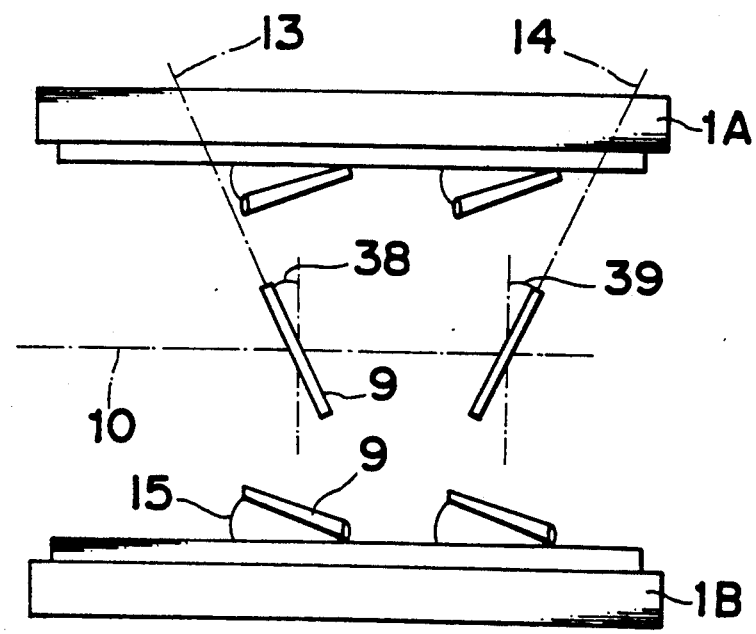
FIG. 12 is a schematic sectional view showing the orientation of the liquid crystal molecules when the voltage is applied to the liquid crystal display device.
Figure 13:
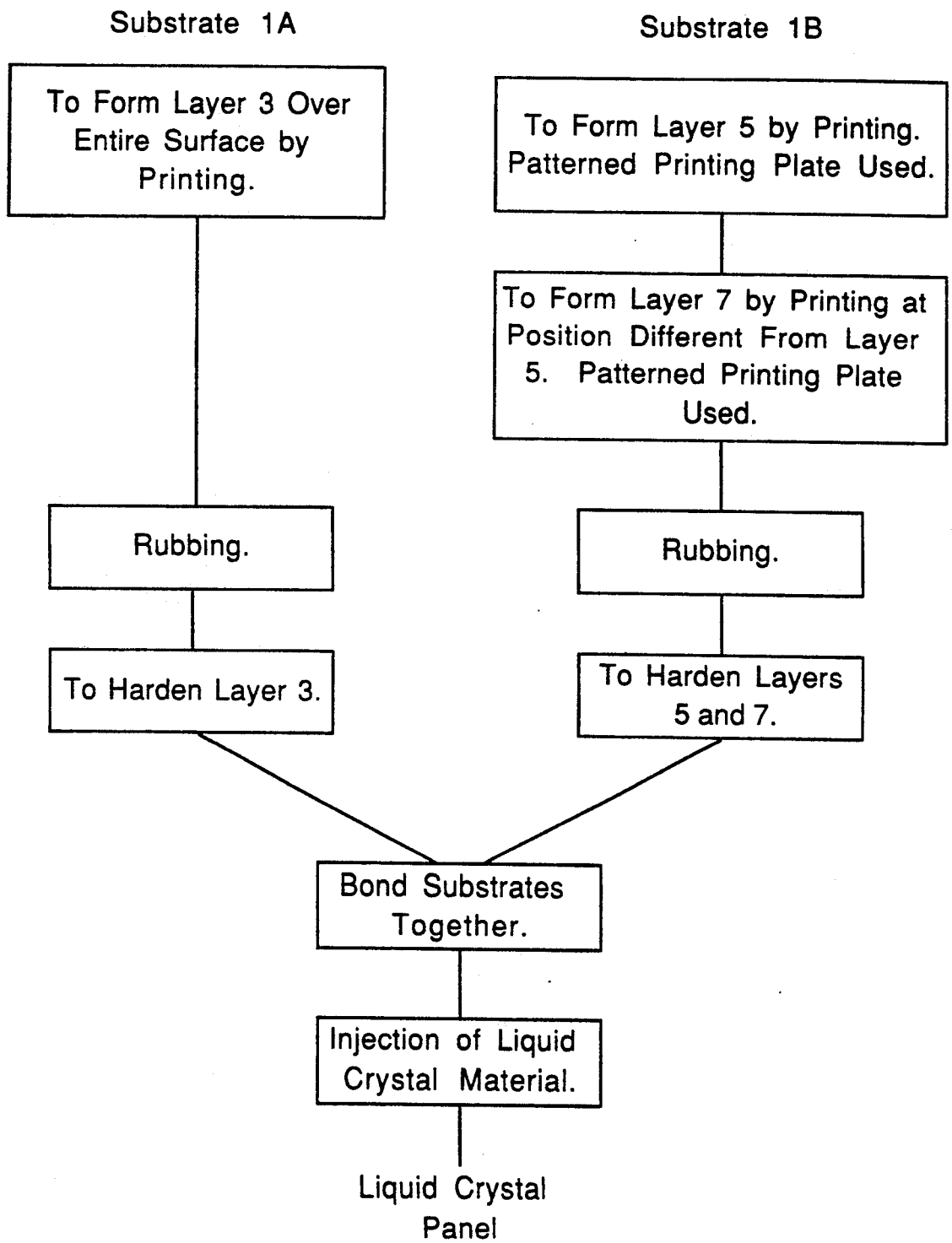
FIGS. 13 to 15 are flowcharts showing the respective methods according to the first to third embodiments of the present invention.

On the other hand, using the same technique, a photosensitive polyimide alignment layer 7 made of photosensitive polyimide (commercially available from Ube Industries, Ltd. of Japan and identified by PI-100) was uniformly printed over the JALS-194 alignment layer 5 formed on the active matrix array substrate 1B, as shown in FIG. 8(b). Then, as shown in FIG. 8(c) using a mask 33 designed to shield upper halves of the pixels 30 on the substrate 1B, exposure to ultraviolet rays of light was followed by an etching in an etching solution, specially prepared for the PI-100 alignment layer 7, to remove portions of the PI-100 alignment layer 7 overlaying upper halves of the pixels 30 which had been shielded as shown in FIG. 8(d). After this photolithographic process, the PI-100 alignment layer 7 remaining on the substrate 1B were heated at 250° C. for one hour to cure.

By the foregoing process, the JALS-194 alignment layer 5 and the PI-100 alignment layer 7 were formed on the active matrix substrate 1B while overlaying the upper halves of the pixels 30 and the lower halves of the same pixels 30, respectively.

The substrates 1A and 1B were then rubbed with Rayon fabric in respective direction shown by the arrows 18 and 19 in FIG. 4, and the substrates 1A and 1B were then bonded together with the line electrode array 2A facing the column electrode array 2B, thereby completing a panel. The pre-tilt angle 6 of the PI-100 alignment layer 7 had been previously confirmed to be about 1° C. as measured by the use of the measurement employed in the first embodiment of the present invention.

Liquid crystal material added with a chiral material R-811 (commercially available from Merck and identified by ZLI-4792), having a clockwise twisting power, to render the chiral pitch to be about 80 μm was finally injected in the panel so prepared.

The liquid crystal display device of the present invention was prepared by bonding a polarizing plate to each surface of the liquid crystal panel, prepared in the manner described above, so as to represent a cross Nicols. When a measurement was carried out to determine the transmission characteristic thereof dependent on the viewing angle by applying a voltage to the liquid crystal panel, a characteristic similar to that according to the first embodiment could be observed.

When the liquid crystal display device so assembled was incorporated in the image projection system and an image was the projected onto a screen, a favorable display of a high-quality image could be obtained at a uniform brightness.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A liquid crystal display device including a liquid crystal panel, said liquid crystal device comprising:
   first and second substrates;
   a first alignment layer formed on a surface of the first substrate so as to have a first pre-tilt angle;
   a second alignment layer formed on a surface of the second substrate so as to have a second pre-tilt angle which is smaller than said first pre-tilt angle;
   a third alignment layer formed on the surface of the second substrate so as to have a third pre-tilt angle which is greater than said first pre-tilt angle, said second and third alignment layers being arranged on the surface of the second substrate in a neighboring relationship;
   said liquid crystal panel being oriented so as to have a helical structure extending in a predetermined direction by the effect of said pre-tilt angles if nematic liquid crystal material having no twisting power were to be filled in a space between the first and second substrates; and
   nematic liquid crystal material having a twisting power effective to render the liquid crystal panel to be oriented so as to have a helical structure extending in a direction counter to said predetermined direction, said nematic liquid crystal material having the twisting power being filled in the space between the first and second substrates.

2. The liquid crystal display device as claimed in claim 1, wherein said second substrate has a matrix of pixels formed thereon, and wherein said second and third alignment layers are formed over the matrix of the pixels in the neighboring relationship.

3. The liquid crystal display device as claimed in claim 1, wherein said second substrate has a matrix of pixels formed thereon, each of said pixels being connected with at least one thin-film transistor element.

4. A method of making a liquid crystal display device of a structure defined in claim 1, said method comprising the steps of:

forming the second alignment layer, which gives the second pre-tilt angle when rubbed, by means of a printing technique, on a predetermined portion of the surface of the second substrate;

subsequently forming the third alignment layer, which gives the third pre-tilt angle when rubbed, by means of a printing technique, on another portion of the surface of the second substrate different from said predetermined portion, said third pre-tilt angle being different from that of the second alignment layer.

5. The method as claimed in claim 4, wherein each of said alignment layers is made of polyimide.

6. A method of making a liquid crystal display device of a structure defined in claim 1, said method comprising the steps of:

applying the second alignment layer, which gives the second pre-tilt angle when rubbed, to the surface of the second substrate;

placing a first mask, having a predetermined pattern, partly over the second alignment layer;

applying the third alignment layer, which gives the third pre-tilt angle different from that of the second alignment layer when rubbed, over the second alignment layer;

forming a second mask over a portion of the second alignment layer which is not shielded by the first mask, thereby to partly shield the third alignment layer;

etching the third alignment layer to remove a portion of the third alignment layer at which no mask is formed; and removing the first and second masks.

7. The method as claimed in claim 6, wherein each of said alignment layers is made of polyimide.

8. A method of making a liquid crystal display device of a structure defined in claim 1, said method comprising the steps of:

applying the second alignment layer, which gives the second pre-tilt angle when rubbed, to the surface of the second substrate;

applying the third alignment layer, which has a photosensitive property and which gives the third pre-tilt angle different from that of the second alignment layer when rubbed, over the second alignment layer;

partly shielding the third alignment layer by means of a masking material having a predetermined pattern;

exposing a portion of the third alignment layer, which is exposed through the masking material, to rays of light; and etching the third alignment layer to remove that portion of the third alignment layer which has been shielded by the masking material.

9. The method as claimed in claim 8, wherein each of said alignment layers is made of polyimide.

* * * * *